3,629,175
METHOD OF PREPARING DISPERSIONS OF CARBOXYL-CONTAINING POLYMERS

Carl Moore, Midland, Mich., and James B. Louch, North Hampton, Va., assignors to The Dow Chemical Company, Midland, Mich.
No Drawing. Filed June 12, 1969, Ser. No. 832,869
Int. Cl. C08d 41/00
U.S. Cl. 260—29.6 E 12 Claims

ABSTRACT OF THE DISCLOSURE

Dispersions of carboxyl-containing polymers such as 1,2-polybutadiene having terminal carboxyl groups are prepared by dispersing the polymer in an at least partially water-miscible alcohol, such as ethanol, which is characterized by being incapable of solubilizing the polymer, and contacting the carboxyl-containing polymer with an alkaline compound in water such as sodium hydroxide to neutralize at least some of the carboxyl groups of the polymer and thereby form the dispersion. All or a part of the alcohol can be separated from the dispersion if desired such as by distillation under vacuum. The dispersions can be used to provide protective coatings on metal or non-metal substrates.

---

This invention relates to the art of dispersions. In one aspect, this invention relates to methods of preparing dispersions of carboxyl-containing polymers. In another aspect, this invention relates to methods of preparing electrodeposition bath compositions containing a polymer which is deposited by electrophoresis.

The art of preparing aqueous dispersions of polymers is replete with techniques which result in the formation of a latex having the polymer in the form of colloidal particles. For some polymer materials, the dispersion or latex is prepared by the so-called direct dispersion technique. This technique involves merely mixing the polymer with an aqueous base under proper conditions of temperature to produce a latex having the polymer dispersed throughout in the form of finely divided particles. Unfortunately, many polymers cannot be made into a latex by such a simple and inexpensive procedure because the polymers are not amenable to the direct dispersion technique.

In the art of forming latexes of polymers which cannot be directly dispersed, the polymer is first dissolved in a water-miscible solvent and the resulting solution then added to an aqueous base with concomitant separation and removal of the solvent. The neutralized polymer remains in the aqueous phase in the form of a dispersion of finely divided polymer particles which are usually of colloidal size. Another and somewhat related technique disclosed in the art for producing polymer latexes involves forming a salt of the polymer, dissolving this salt in a water-miscible solvent, mixing the resulting solution with water and a precipitant to form an opalescence in the mixture, and distilling the mixture to remove the solvent and the precipitant. The residual water phase contains the polymer salt in the form of a dispersion of finely divided particles.

In the case of polymers which cannot be directly dispersed into an aqueous base, the prior art techniques for forming dispersions of these polymers require that a solvent be employed to dissolve the polymer before the dispersion can actually be formed. This shortcoming in the art of preparing dispersions has imposed serious limitations on the use of polymer latexes. Since solvent recovery and/or disposal necessitates the use of expensive and elaborate equipment, efforts are continually being made to provide better and more efficient ways for preparing polymer dispersions. Moreover, the cost of the solvents themselves has in some cases limited the use of a polymer in the form of a latex.

According to this invention, these and other disadvantages of the prior art techniques for preparing dispersions are overcome by the steps which comprise dispersing a carboxyl-containing polymer in an at least partially water-miscible alcohol characterized by being incapable of solubilizing the carboxyl-containing polymer and contacting the polymer with an alkaline compound in water to neutralize at least some of the carboxyl groups of the polymer and thereby form the dispersion. Some or all of the alcohol can then be separated from the dispersion if desired by volatilization. In a modification of the invention, the polymer can be dispersed in a mixture comprising water and the alcohol. In this modification, the resulting dispersion of the polymer is stable and can be utilized with a portion of the alcohol left in the dispersion or with substantially all of the alcohol removed.

Accordingly, it is an object of this invention to prepare polymer dispersions.

Another object of this invention is to provide a method of preparing dispersions of carboxyl-containing polymers.

A further object of this invention is to provide a dispersion of polymer particles in an aqueous medium suitable for use in an electrodeposition bath for coating a substrate.

Yet another object of this invention is to provide a less expensive, more efficient, and improved method of preparing a dispersion from polymers without dissolving the polymer.

These and other objects of the invention will become apparent to one skilled in the art after studying the following detailed description and the appended claims.

In the practice of this invention, a dispersion of a carboxyl-containing polymer which is incapable of direct dispersion in an aqueous base is prepared by dispersing the polymer in an at least partially water-miscible alcohol characterized by being incapable of solubilizing the polymer and neutralizing at least some of the carboxyl groups of the polymer by contacting with an alkaline compound in water to form the dispersion. As previously indicated, the dispersion can be used with the alcohol or all or a portion of the alcohol can be removed from the dispersion. In another embodiment of the invention, the carboxyl-containing polymer is dispersed in a mixture comprising the alcohol and water prior to neutralization with the alkaline compound. In yet another embodiment of the invention, the alcohol-polymer mixture is contacted with the alkaline compound to neutralize at least some of the carboxyl groups and form a salt of the polymer. The resulting alcohol-polymer salt is then mixed with a comparatively large volume of water to form the aqueous dispersion. During this latter step, at least some of the alcohol can be removed from the dispersion if desired such as by distillation or the like. While the foregoing alternatives reflect variations which can be made in the method of preparing dispersions, it is evident that the invention is not to be limited by the actual order of steps and that many variations and alternatives can be made without departing from the spirit and scope of the invention.

Carboxyl-containing polymers which can be formed into a dispersion according to the teachings of this invention include diene polymers prepared from monomers having between 4 and 6 carbon atoms per molecule such as butadiene, isoprene, 1,3 - pentadiene, 2,3 - dimethyl-1,3-butadiene, mixtures of two or more of the monomers, and the like; styrene polymers such as polystyrene and poly(α-methyl styrene); and block copolymers of α-methyl styrene and an aliphatic conjugated diolefin.

The preferred diene polymers are those produced under polymerization conditions which result in the formation of pendant vinyl groups on alternate carbon atoms of the polymer chains. Thus, the diene polymers have predominant 1,2 configuration and preferably have at least about 80 percent 1,2 configuration. Typical diene polymers include 1,2-polybutadiene, 3,4-polyisoprene, and the like. The diene polymers can be chemically treated to place carboxyl groups in a random manner along the polymer chains. This can be accomplished by reacting the polymer with thioglycolic acid, for example, under suitable conditions to attach carboxyl groups to the pendant vinyl groups.

The diene polymers which can be formed into a dispersion according to the teachings of this invention can be prepared by ionic polymerization of the diene monomers. In an exemplary reaction, an alkali metal such as, for example, lithium or sodium is added to a polar solvent such as tetrahydrofuran along with the diene monomers. The diene undergoes 1,2 polymerization to produce a polyaliphatic hydrocarbon polymer terminated by the alkali metal and characterized by having an elongated carbon chain with pendant vinyl groups on alternate carbon atoms of the chain. This so-called "living polymer" can then be terminated with various reactants to produce polymers having hydroxyl, carboxyl, or amine terminal ends which can be formed into a dispersion according to the invention. In the formation of hydroxyl terminal ends on the polymer chains, the polymer is reacted with ethylene oxide or a similar suitable organic oxide and subsequently acidified to provide the 1,2-dienediol polymer. Alternatively, the diene polymer is reacted with oxygen and subsequently acidified to produce the 1,2-dienediol polymer. In the formation of carboxyl terminal ends on the polymer chains, the living polymer is reacted with carbon dioxide and subsequently acidified to produce the 1,2-dienedicarboxylic acid polymer. As previously indicated, the diene polymers which can be formed into a dispersion according to this invention can also have amine terminal ends. This can be accomplished, for example, by treating the dienedicarboxylic acid polymer with ethyleneimine to convert the carboxyl groups to amino-ester groups.

While the pendant vinyl groups of the diene polymers can optionally be provided with carboxyl groups when the polymer has carboxyl terminal ends, acid functionality of this type must be employed when the diene polymer is an ordinary hydrocarbon diene polymer or when the diene polymer has hydroxyl or amine termination. Acid functionality in the form of terminal carboxyl groups or in the form of carboxyl groups along the polymer chains is necessary for reaction with the alkaline compound in forming a dispersion according to the invention. While it has been shown that carboxyl terminated diene polymers have sufficient acid functionality to practice the invention, in some instances it may be desirable to increase the acid content of the polymer, particularly with those polymers having a relatively high degree of polymerization.

Styrene polymers which cannot be directly dispersed to form a latex or emulsion but which can be formed into a dispersion according to the teachings of this invention include carboxyl terminated polystyrene and carboxyl terminated poly(α-methyl styrene). Styrene polymers having varying degrees of polymerization can be treated to provide terminal carboxyl groups by any suitable technique.

Block copolymers of α-methyl styrene and an aliphatic conjugated diolefin which can be formed into a dispersion according to this invention include copolymers characterized by having α-methyl styrene trimer to hexamer blocks and aliphatic conjugated diolefin monomers polymerized on to each end of the α-methyl styrene block. Aliphatic conjugated diolefins of the type described in connection with the diene polymers can be polymerized on to the α-methyl styrene block. The block copolymers have terminal ends of hydroxyl, carboxyl, or amine groups. The aliphatic conjugated diolefin portions of the block copolymers desirably have 1,2 configuration thus providing pendant vinyl groups on alternate carbon atoms. These pendant vinyl groups can be provided wtih carboxyl groups to provide more acid functionality in the polymer by reaction with, for example, thioglycolic acid in the same manner as previously described in connection with the diene polymers. Of course, when the block copolymers have hydroxyl or amine termination the pendant vinyl groups must of necessity be provided with carboxyl groups to render the block copolymers amenable to the dispersion technique of the invention.

Exemplary block copolymers having terminal carboxyl groups of the type described above are represented by the formula HOOC—$(B)_y(A)_x(B)_y$—COOH wherein A represents a molecule of the α-methyl styrene after it has become a part of the block copolymer, $x$ is an integer of between 3 and 6, inclusive, each B represents a molecule of the aliphatic conjugated diolefin after it has become a part of the block copolymer, each $y$ is an integer of between 1 and about 60, and the HOOC— and —COOH portions represent carboxylic acid groups attached to the ends of the block copolymer.

Other functionally terminated block copolymers which can be formed into a dispersion according to this invention can have a block of poly(α-methyl styrene) trimer to hexamer, polystyrene blocks or units on each end of the poly(α-methyl styrene) block, and blocks of polymerized conjugated diolefin monomers on each end of the polystyrene blocks. Another type of block copolymer which can be formed into a dispersion according to this invention is one having a block or unit of poly(α-methyl styrene) trimer to hexamer, blocks of a polymerized aliphatic conjugated diolefin attached to each end of the poly(α-methyl styrene) block, and blocks of polystyrene attached on each end of the blocks of the polymerized aliphatic conjugated diolefin.

In general, the foregoing illustrated block copolymers have degrees of polymerization of between about 5 and about 150. The aliphatic conjugated diolefin monomers are polymerized to provide predominantly 1,2 configuration. This results in pendant vinyl groups on alternate carbon atoms of the aliphatic conjugated diolefin portion of the molecule. The vinyl groups can be reacted with, for example, thioglycolic acid to provide additional acid functionality if desired. As indicated with respect to the block copolymers illustrated by the general formula above, the other illustrative block copolymers can have carboxyl, hydroxyl, or amine termination. When the terminal ends are hydroxyl or amine, acid functionality can be obtained by treating the polymer to produce carboxyl groups on at least some of the pendant vinyl groups.

As used herein, the degree of polymerization of the block copolymers is defined as the sum total of the number of α-methyl styrene molecules and the number of aliphatic conjugated molecules in a particular block copolymer molecule. The terminal groups of the block copolymer are not taken into consideration when calculating the degree of polymerization for a particular polymer. Thus, for example, a block copolymer having α-methyl styrene tetramer and 2 molecules of an aliphatic conjugated diolefin on each side of the α-methyl styrene block has a degree of polymerization of 8.

The block copolymers can be prepared by a variety of suitable techniques. While the invention is not to be bound by or predicated upon any particular method for their preparation, an alkali metal addition compound of α-methyl styrene trimer to hexamer such as is described in U.S. Pat. 2,985,594 is reacted with a conjugated diolefin such as 1,3-butadiene or a mixture of conjugated diolefins to produce a so-called living block copolymer having reactive groups on the ends of the aliphatic conjugated diolefin portion of the polymer. The resulting block copolymer can be terminated with carboxyl, hydroxyl, or amine groups by reacting the polymer with the corresponding terminating agent. U.S. Pat. 3,346,666 is exemplary of one technique which can be used for providing carboxyl groups on the ends of the block copolymer.

The degree of polymerization of the polymers which are formed into a dispersion by the method of this invention can vary over wide limits. In general, the diene polymers have a degree of polymerization of between about 8 and about 200. The styrene polymers have a degree of polymerization of between about 5 and about 200. The block copolymers have a degree of polymerization of between about 5 and about 150.

The acid functionality of the polymers in terms of the number of carboxyl groups per polymer molecule can vary from about 2 carboxyl groups per molecule with no practical upper limit except that as dictated by the number of acid groups which can be attached to the polymer chains. In general, the polymers have a carboxyl activity of between about 0.2 and about 2 milliequivalents per gram of polymer.

The alcohol which serves as a medium for the carboxyl-containing polymer before formation of the actual dispersion is at least partially water-miscible and is selected so as to be incapable of acting as a solvent for the polymer. Alcohols which can be employed in the practice of the invention include straight and branched chain aliphatic alcohols having up to about 10 carbon atoms per molecule and cyclic alcohols. Exemplary alcohols within the general classifications include methanol, ethanol, isopropanol, n-propanol, n-butanol, isobutanol, cyclohexanol, and the like. Mixtures of two or more of the foregoing alcohols can be used if desired.

In that embodiment of the invention wherein the alcohol is removed from the dispersion by distillation, the alcohol must have a boiling point below about 100° C. or be of a type which forms an azeotropic mixture with water characterized by having a boiling point below about 100° C. When it is desirous to form a dispersion containing some alcohol, the alcohol employed can be only partially water-miscible and the alcohol phase can be separated from the dispersion by techniques other than distillation.

As used herein, the term "alkaline compound" is intended to include any suitable material which will neutralize the carboxyl groups of the polymer which is to be dispersed. Exemplary alkaline compounds include amines such as pyridine, piperidine, cyclohexylamine, ethylamine, diethylamine, triethylamine, dioctylamine, trioctylamine, dipentylamine, tripentylamine, quaternized amine, ammonia, and alkali metal hydroxides such as sodium hydroxide, potassium hydroxide, and the like. The alkaline compound is employed in an amount to neutralize a sufficient number of the carboxyl groups of the polymer to form the dispersion. Since the actual concentration of the alkaline compound in the water which is added to the alcohol containing the polymer will depend upon such factors as the carboxyl content of the polymer, the degree of polymerization of the polymer, the type of alkaline compound employed, the utility intended for the prepared dispersion, and the like, it is evident that the concentration of the alkaline compound relative to the carboxyl groups in the polymer can vary over wide limits.

As previously indicated, at least some of the alcohol can be separated from the resulting dispersion. This can be accomplished concomitantly with the addition of the water containing the alkaline compound or it can be separated at a later time if desired. Depending upon the intended use for the dispersion, it may be desirable to leave all or a portion of the alcohol in the dispersion.

The technique for preparing the dispersion can involve adding the water containing the alkaline compound to the alcohol which contains the carboxyl-containing polymer. Alternatively, the carboxyl-containing polymer can be dispersed in a mixture of water and the alcohol and the water containing the alkaline compound can then be added to this mixture. In yet another modification, the carboxyl-containing polymer is dispersed in the alcohol and subsequently neutralized by adding a relatively small amount of water containing the alkaline compound thereby forming a salt of the polymer in the alcohol. A relatively large quantity of water can then be added to form the dispersion.

The dispersions prepared in accordance with the teachings of this invention can be used in a variety of different ways for a multitude of purposes. The dispersion is particularly suitable for use in the art of electrophoresis because of the ease with which the polymer particles can be made to migrate to an anode under the influence of direct current in an electrodeposition bath. The dispersions are also particularly suitable for providing protective coatings on metal or non-metal articles or substrates by spray coating or dip coating.

Dispersions prepared by the method of this invention can have a solids content of up to about 55 percent with a pH in the range of between about 8 and 12. The size of the polymer particles will vary over wide limits but is generally between about 1500 and about 4000 angstroms. Since the characteristics of a particular dispersion will depend upon such factors as the type of polymer, the carboxyl content, the neutralizing agent, and the like, the ranges reported above are intended to be exemplary only and should not be construed as limiting of the invention.

The conditions of temperature and pressure, employed in preparing dispersions according to this invention will likewise depend upon such factors as acid functionality, type of alcohol, degree of polymerization of the polymer, and the like. In general, temperatures between about 40° and about 100° C. can be employed in making the dispersion. Higher temperatures can be used when the technique is practiced under pressure. As a general proposition, with high acid functionality the method can be practiced at room temperature.

The following examples illustrate the invention by way of describing techniques which can be followed in preparing dispersions. It is to be understood that these examples are for the purpose of illustration only and should not be construed as limiting the scope of the invention.

EXAMPLE I

A dispersion of a block copolymer of $\alpha$-methyl styrene tetramer and 1,3-butadiene having terminal carboxyl groups was prepared by charging 720 grams of the polymer to a five-liter flask equipped with a stirrer and containing 1200 milliliters of isopropyl alcohol. The polymer had a carboxyl concentration of about 0.372 milliequivalent per gram and a degree of polymerization of about 62. The diene portion of the polymer was characterized by having predominantly 1,2 configuration thereby resulting in pendant vinyl groups on alternate carbon atoms of the polymer chains.

The isopropyl alcohol and polymer was stirred in the flask at a controlled temperature of about 55° C. About 16.3 grams of ammonium hydroxide containing 28 percent ammonia was then added to the flask dropwise over a 5 minute period. About 2900 milliliters of deionized water was then added to the flask over a 20 minute period and a viscous emulsion was formed. The emulsion was then distilled under vacuum over a 2 hour period during which time ammonium hydroxide was added in increments to prevent the pH from decreasing. The distillation was conducted with a pot temperature of about 55° C. and with a minimum and maximum head temperature of about 41° C. and about 52° C., respectively. After distillation, the sample was cooled to room temperature and filtered through cloth. The resulting dispersion was a clean, low viscosity, white latex with a yield of about 3807 grams, a solids content of about 17 percent, and a pH of about 9.5.

EXAMPLE II

A dispersion of a block copolymer was prepared by charging 37 grams of the polymer to a three-neck, 250 milliliter round bottom flask equipped with a stirrer and containing 100 milliliters of deionized water. The block copolymer was α-methyl styrene tetramer and 1,3-butadiene having a carboxyl concentration of about 0.37 milliequivalent per gram of polymer and a degree of polymerization of about 62. The diene portion of the polymer had predominant 1,2 configuration thereby resulting in pendant vinyl groups on alternate carbon atoms of the polymer chains.

The water in the flask was heated and the polymer stirred vigorously for about 30 minutes. The ingredients were then cooled to about 40° C. and 25 milliliters of 0.5 N potassium hydroxide was added dropwise over a 30 minute period. This resulted in the formation of a paste-like white mixture in the flask. The mixture was then heated to about 80° C. in an effort to form an emulsion but no change was noted in the paste-like mixture. About 40 milliliters of isopropyl alcohol was then added to the flask and the paste-like mixture converted almost immediately to an emulsion having a solids content of about 32.1 percent and a pH of about 11.7 after distillation.

EXAMPLE III

A three-neck, three-liter, round bottom flask equipped with a stirrer and a reflux condenser was charged with about 700 milliliters of ethanol and heated until the alcohol began to reflux. About 606 grams of a block copolymer of α-methyl styrene tetramer and 1,3-butadiene having predominantly 1,2 configuration, a degree of polymerization of about 75, and a carboxyl concentration of about 0.41 milliequivalent per gram of polymer was preheated to a temperature of about 90° C. and added to the refluxing ethanol. About 62.6 grams of 20 percent potassium hydroxide in one liter of deionized water was added to the flask over a 15-minute period and at a rate which maintained the flask temperature between about 65° and about 72° C. This resulted in the formation of a very thick, white, jelly-like emulsified mass. The mass was then distilled under reduced pressure over a period of about 1.5 hours. After distillation, the emulsion was cooled and filtered through a varnish filter. The procedure yielded 1256 grams of a white, fairly low viscosity latex having an average particle size greater than about 3000 angstroms. The dispersion had a solids content of about 38.1 percent, a pH of about 10.2, and a surface tension of about 58.9 dynes per centimeter.

EXAMPLE IV

The equipment described in Example III was employed to prepare a dispersion of a block copolymer of α-methyl styrene tetramer and 1,3-butadiene having predominant 1,2 configuration, a degre of polymerization of about 75, and a carboxyl concentration of about 0.41 milliequivalents per gram of polymer. About 80 milliliters of deionized water was added to the flask and heated to reflux. About 55 grams of the polymer was preheated to a temperature of about 90° C. and then added to the refluxing water. About 2.12 milliliters of 20 percent potassium hydroxide was diluted with 20 milliliters of deionized water and the total added dropwise to the flask over a 20 minute period. At the end of this period, and for the next 75 minutes, the ingredients in the flask begin to coagulate with severe coagulation at the end of the 75-minute period. At the end of the 75-minute period, 10 milliliters of 28 percent ammonium hydroxide was added dropwise for about 15 minutes with no visible improvement in reducing the coagulation. This was followed with dropwise addition of 30 milliliters of 28 percent ammonium hydroxide with still no improvement in cogulation. At the end of this period, a solution of 0.64 milliliter of 20 percent potassium hydroxide diluted with 20 milliliters of deionized water was added dropwise whereupon rapid agglomeration occurred when 9 milliliters had been added. Successive addition of 60 milliliters of isopropyl alcohol and 60 milliliters of deionized water over a 15 minute period resulted in a viscous, substantially transparent mixture. An additional 60 milliliters of deionized water was added and this was followed with an additional 60 milliliters of isopropyl alcohol. The alcohol was then distilled off resulting in a thick homogeneous latex. The technique yielded about 278 grams of a white, low viscosity dispersion having a solids content of 17.7 percent, a pH of about 9.5, and a particle size of about 2800 angstroms (as determined by dissymmetry using a red line with a wave length of 5193 angstroms).

EXAMPLE V

A dispersion of a block copolymer of α-methyl styrene and 1,3-butadiene having predominant 1,2 configuration was prepared by charging 372 grams of the polymer and 600 grams isopropyl alcohol to a three-neck, three-liter flask equipped with stirring means and a reflux condenser. The polymer had a degree of polymerization of about 75 and a carboxyl concentration of about 0.37 milliequivalent per gram of polymer. The polymer and alcohol was heated in the flask and maintained at a temperature of about 50° C. About 18.6 milliliters of 28 percent ammonium hydroxide was added dropwise to the heated flask with stirring. About 1400 milliliters of deionized water was then added dropwise over a ten minute period. When the deionized water was added to the flask, a translucent jellied mass was formed. The isopropyl alcohol was then distilled off under vacuum for a period of about one hour. At the end of about 40 minutes of the vacuum distillation step, the translucent mass changed quite rapidly into a low viscosity, white dispersion. The resulting dispersion has a solids content of about 22 percent, a pH of about 8.4, and a particle size of about 2350 angstroms (red line technique using a wave length of about 5193 angstroms). The dispersion had no detectable odor of ammonia or isopropyl alcohol.

EXAMPLE VI

A three-neck, five-liter, round bottom flask equipped with a heating mantle, a glass stirrer, and a reflux condenser was used to prepare a dispersion of a block copolymer of α-methyl styrene and 1,3-butadiene having predominant 1,2 configuration, a degree of polymerization of about 73, and a carboxyl concentration of about 0.30 milliequivalent per gram of polymer. A mixture of 1200 milliliters of isopropyl alcohol and 2400 milliliters of deionized water was added to the flask and heated to reflux. About 713 grams of the polymer was heated to a temperature of about 90° C. and then added to the refluxing mixture with stirring. About 125 milliliters of 0.5 N potassium hydroxide was added dropwise to the flask over a period of about 15 minutes. At the end of about 6 minutes during this period (25 milliliters of potassium hydroxide added), an emulsion begins to form in the flask. The pH of the emulsion was measured during the 15 minute period and varied from slightly less than 8 to a maximum of 8.5 at the end of the period. The dispersion was then cooled and filtered through a fine varnish filter. The filter retained only a very small amount of the solids from the dispersion. The resulting product was a white, fluid dispersion having a solids content of about 26.9 percent, a pH of about 9, and a surface tension of about 50.8 dynes per centimeter. The particle size of the solids in the dispersion was greater than 3000 angstroms. The dispersion containing the alcohol was charged to an electrodeposition bath and several metal articles were coated by passing direct current through the bath. The resulting coatings adhered well to the metal articles and were of uniform thickness.

EXAMPLE VII

A dispersion of the polymer described in Example VI was prepared with the equipment described in Example VI by charging 1200 milliliters of isopropyl alcohol to the flask and then heating to reflux. About 766 grams of the polymer was heated to a temperature of 90° C. and added to the refluxing alcohol with stirring. After all of the polymer was added, stirring was continued at reflux for about 20 minutes. About 61 grams of 20 percent potassium hydroxide in deionized water was added dropwise over a 20 minute period. A brown precipitate formed in the flask during the addition of the potassium hydroxide. About 2400 milliliters of deionized water was then added dropwise to the refluxing alcohol and polymer over a 20-minute period. The precipitate quickly changed during the addition of the water to a viscous, creamy smooth dispersion. Stirring was continued for a 30-minute period after which the flask was cooled to room temperature. After standing overnight, the alcohol was distilled off under vacuum and the remaining dispersion cooled to room temperature without stirring. The resulting product was filtered through a double fine varnish filter which did not retain any of the solids. The filtered product was in the form of a low viscosity, white dispersion containing a residue of isopropyl alcohol as evidence by odor. The dispersion had a solids content of about 24 percent, a pH of about 10.7, and a surface tension of about 50.5 dynes per centimeter. The average particle size of the solids as determined by dissymmetry (red line having a wave length of about 5193 angstroms) was 2690 angstroms. The dispersion was electrodeposited by electrophoresis on various metal articles under influence of direct current in an electrodeposition bath. This produced smooth and uniform coatings on the metal articles. The polymer exhibited excellent throwing power during electrodeposition.

EXAMPLE VIII

The equipment described in Example VI was employed to prepare a dispersion of a block copolymer of α-methyl styrene tetramer and 1,3-butadiene having predominant 1,2 configuration, a degree of polymerization of about 76, and a carboxyl concentration of about 0.29 milliequivalent per gram of polymer. About 1200 milliliters of isopropyl alcohol was added to the flask and heated to reflux. About 308 grams of the polymer was heated to a temperature of about 40° C. and then added to the refluxing alcohol with stirring. After all of the polymer was added, the resulting non-homogeneous mixture in the flask was stirred for a period of 30 minutes. About 20.6 milliliters of 20 percent potassium hydroxide was added dropwise to the flask with stirring over a 30-minute period with very little noticeable change in the non-homogeneous mixture. At the end of this period, 20 milliliters of deionized water preheated to a temperature of between about 90° and about 95° C. was added quite rapidly from a dropping funnel over a period of about 15 minutes. The mixture in the flask changed from a non-homogeneous, yellow colored mass to a semi-translucent, cream color dispersion. The alcohol was distilled off under vacuum until a head temperature of about 59° C. was attained whereupon the dispersion was cooled. The resulting low viscosity, white colored dispersion was filtered through an extra fine varnish filter. No solids were retained by the filter. The dispersion had a solids content of 14.3 percent, a pH of about 10.4, and an average particle size of 2630 angstroms (determined by red line dissymmetry having a wave length of 5193 angstroms). The dispersion was later concentrated by evaporation until a solids content of 51.8 percent was reached. The final product having 51.8 percent solids was electrodeposited on several metal articles.

EXAMPLE IX

The equipment described in Example VI was used to prepare a dispersion of the polymer described in Example VIII by charging the flask with 400 milliliters of isopropyl alcohol and then heating to reflux. About 646 grams of the polymer was preheated and added to the refluxing alcohol with stirring. This produced an amber colored mixture in the flask. About 43.3 milliliters of 20 percent potassium hydroxide was then added to the flask dropwise over a 25-minute period to neutralize at least some of the carboxyl groups contained in the polymer. About 2100 milliliters of hot deionized water was added quite rapidly with stirring over a ten minute period. At the end of this period, a low viscosity dispersion containing the alcohol was produced.

The dispersion was then subjected to distillation under vacuum to remove some of the isopropyl alcohol. The resulting product was in the form of a low viscosity dispersion containing some isopropyl alcohol.

EXAMPLE X

A 500-milliliter, three-neck round bottom flask equipped with a motor and stirrer, reflux condenser, temperature controller, and heat lamp was used to prepare a dispersion of a block copolymer of α-methyl styrene tetramer and 1,3-butadiene having predominant 1,2 configuration, a degree of polymerization of about 8, and a carboxyl concentration of about 2 milliequivalents per gram of polymer. The polymer was characterized by having terminal carboxyl groups. About 35 grams of the polymer and 100 milliliters of ethyl alcohol was charged to the flask and heated quickly with stirring to a temperature of about 75° C. About 60.5 milliliters of a 20 percent solution of potassium hydroxide was then added to the flask and a white dispersion immediately formed. After about 20 minutes of heating, the dispersion attained an amber color and began to reflux. The dispersion was then subjected to distillation under vacuum for a period of about one hour to remove the ethyl alcohol after which the dispersion was cooled to room temperature. The resulting dispersion was very clear and had a yellow to amber color. The dispersion was evaluated and found to have a solids content of about 38.5 percent, a pH of about 12.5, and an average particle size of about 1875 angstroms (determined by dissymmetry using green line having a wavelength of about 4094 angstroms).

EXAMPLE XI

A dispersion of the polymer described in Example X was prepared with the equipment described in Example X by charging the flask with about 50 milliliters of methyl alcohol and 35 grams of the carboxyl terminated polymer. The flask was heated with stirring and the methyl alcohol containing the unsolubilized polymer allowed to reflux for 30 minutes. About 8.3 milliliters of 20 percent potassium hydroxide was diluted with about 100 milliliters of deionized water and the total added dropwise to the refluxing mixture. A dispersion containing small particles formed immediately. Refluxing was continued with stirring for about 30 minutes whereupon distillation under vacuum was initiated to remove the methyl alcohol. After distilling for 30 minutes, the dispersion was allowed to cool to room temperature. The resulting low viscosity dispersion had a solids content of about 30.8 percent, a pH of about 8, and a particle size of about 2660 angstroms (as determined by dissymmetry using red line having a wavelength of about 5193 angstroms).

EXAMPLE XII

The equipment described in Example X was used to prepare a dispersion of a carboxyl terminated block copolymer of α-methyl styrene tetramer and 1,3-butadiene having a degree of polymerization of about 51 and a carboxyl concentration of about 0.59 milliequivalent per gram of polymer. About 100 grams of ethyl alcohol and about 29 grams of the polymer were added to the flask and heated to reflux with stirring. After refluxing for a period of about 15 minutes, it was noted that the polymer did not go into solution. A solution of 20 percent potassium hydroxide in an amount sufficient to theoretically neutralize all of the carboxyl groups in the polymer was then added dropwise with stirring. A dispersion formed almost immediately with the addition of the potassium hydroxide. After about 30 minutes, the pot temperature was about 85° C. The dispersion was then subjected to distillation at atmospheric pressure to remove the ethyl alcohol. After 20 minutes of distillation, the pot temperature had increased to 87° C. and the head temperature was 81° C. About 50 milliliters of deionized water was then added and after about 20 minutes of continued distillation the pot temperature was about 100° C. and the head temperature about 84° C. The product was in the form of a white, low viscosity dispersion. After cooling to room temperature, the dispersion was filtered through an extra fine varnish filter which did not retain any solids. The dispersion did not have any detectable alcohol odor. The dispersion had a solids content of about 18.5 percent, a pH of about 11.8, and a particle size of about 2960 angstroms (determined by dissymmetry using red line having a wavelength of about 5193 angstroms).

EXAMPLE XIII

A one-liter, three-neck flask equipped with a temperature controller, heating mantle, stirrer, and reflux condenser was used to prepare a dispersion of a block copolymer of α-methyl styrene tetramer and 1,3-butadiene having predominant 1,2 configuration, a degree of polymerization of about 62, and a carboxyl concentration of about 0.372 milliequivalent per gram of polymer. About 200 grams of ethyl alcohol was placed in the flask and heated to reflux. About 186 grams of the polymer was then added to the refluxing alcohol with stirring. About 18 grams of concentrated potassium hydroxide was then added and after about 10 minutes 500 milliliters of deionized water was added dropwise over a 5-minute period. The temperature of the flask decreased to about 50° C. during the addition of the water and a thick, white colored emulsion formed. The flask was then heated to reflux and distillation of the alcohol under vacuum was effected. The resulting product was in the form of a white colored dispersion having a solids content of about 32.8 percent and a pH of about 10.5. While the dispersion was satisfactory, from these results it does not appear that ethyl alcohol is as good a dispersing agent for this particular polymer as is isopropyl alcohol as evidenced by the results reported in Example I.

Although the invention has been described in considerable detail, it must be understood that such detail is for the purpose of illustration only and that many variations and modifications of the invention can be made by one skilled in the art without departing from the spirit and scope thereof.

What is claimed is:

1. A method of preparing a dispersion of a carboxyl-containing polymer selected from the group consisting of diene polymers, styrene polymers, and block copolymers of α-methyl styrene and aliphatic conjugated diolefins which is incapable of direct dispersion in aqueous base, said method comprising dispersing said carboxyl-containing polymer in a liquid comprising water, an alkaline compound to neutralize at least some of the carboxyl groups of said carboxyl-containing polymer, and an at least partially water-miscible alcohol characterized by being incapable of solubilizing said carboxyl-containing polymer, said alcohol being selected from the group consisting of straight and branched chain aliphatic alcohols having up to about 10 carbon atoms per molecule and cyclic alcohols.

2. A method according to claim 1 wherein said carboxyl-containing polymer is dispersed in said alcohol and subsequently contacted with said alkaline compound and said water.

3. A method according to claim 1 wherein said carboxyl-containing polymer is dispersed in a mixture of said water and said alcohol and subsequently contacted with said alkaline compound.

4. A method according to claim 1 wherein said carboxyl-containing polymer is dispersed in said water and subsequently contacted with said alkaline compound and said alcohol.

5. A method according to claim 1 wherein said alcohol has a boiling point below about 100° C. or which forms an azeotropic mixture with said water characterized by having a boiling point below about 100° C. and wherein at least some of said alcohol is separated from said resulting dispersion by volatilization.

6. A method according to claim 1 wherein said carboxyl-containing polymer is polybutadiene having terminal ends selected from the group consisting of hydroxyl, carboxyl, and amine.

7. A method according to claim 1 wherein said carboxyl-containing polymer is polystyrene having carboxyl groups attached to the terminal ends of the polymer molecules.

8. A method according to claim 1 wherein said carboxyl-containing polymer is poly(α-methyl styrene) having carboxyl groups attached to the terminal ends of the polymer molecules.

9. A method according to claim 1 wherein said carboxyl-containing polymer is a block copolymer of α-methyl styrene and an aliphatic conjugated diolefin having between 4 and 6 carbon atoms per molecule and characterized by having pendant vinyl groups on alternate carbon atoms of the aliphatic conjugated diolefin portion of said block copolymer, said block copolymer having terminal ends selected from the group consisting of hydroxyl, carboxyl, and amine.

10. A method according to claim 9 wherein at least some of the pendant vinyl groups of said block copolymer have carboxyl groups attached thereto.

11. A method according to claim 9 wherein said block copolymer is represented by the formula:

$$HOOC-(B)_y(A)_x(B)_y-COOH$$

wherein A represents a molecule of the α-methyl styrene after it has become a part of the block copolymer, $x$ is an integer of between 3 and 6, inclusive, each B represents a molecule of the aliphatic conjugated diolefin after it has become a part of the block copolymer, each $y$ is an integer of between 1 and about 60, and the HOOC— and —COOH portions represent carboxylic acid groups attached to the ends of the block copolymer.

12. A method according to claim 11 wherein said block copolymer is a block copolymer of α-methyl sytrene tetramer and 1,3-butadiene.

References Cited

UNITED STATES PATENTS

| | | | |
|---|---|---|---|
| 3,245,935 | 4/1966 | Hargreaves et al. | 260—29.6 |
| 3,350,338 | 10/1967 | Savage | 260—29.6 |
| 3,352,806 | 11/1967 | Hicks | 260—29.4 |
| 3,389,109 | 6/1968 | Harmon et al. | 260—29.6 |

MELVIN GOLDSTEIN, Primary Examiner

U.S. Cl. X.R.

117—93; 260—29.6 HN, 29.7 H